United States Patent [19]
Fujikawa et al.

[11] 3,907,018
[45] Sept. 23, 1975

[54] TIRE FILLED WITH FOAMED MATERIAL

[75] Inventors: Akira Fujikawa; Takashi Hoshino, both of Tokyo, Japan

[73] Assignee: Bridgestone Tire Company Limited, Tokyo, Japan

[22] Filed: Dec. 6, 1973

[21] Appl. No.: 422,488

[30] Foreign Application Priority Data
Dec. 27, 1972 Japan.................................. 47-2096

[52] U.S. Cl. ................ 152/310; 152/314; 152/400; 156/110 R
[51] Int. Cl.² ........................................... B60C 7/12
[58] Field of Search ........................... 152/310–318, 152/330, 399, 400; 156/110 R

[56] References Cited
UNITED STATES PATENTS

| | | | |
|---|---|---|---|
| 1,106,113 | 8/1914 | Rucker | 152/314 |
| 1,140,752 | 5/1915 | Leonard | 152/310 |
| 2,399,572 | 4/1946 | Powell et al. | 152/400 |
| 3,022,810 | 2/1962 | Lambe | 152/310 |
| 3,095,917 | 7/1963 | Arsandaux | 152/312 |
| 3,331,423 | 7/1967 | Guin | 152/313 |
| 3,381,735 | 5/1968 | Talcott et al. | 152/313 |
| 3,605,848 | 9/1971 | Lombardi et al. | 152/310 |

*Primary Examiner*—Drayton E. Hoffman
*Attorney, Agent, or Firm*—Sughrue, Rothwell, Mion, Zinn & Macpeak

[57] ABSTRACT

A tire having a tire chamber filled with foamed substance and a blocking ring extending across and integrally secured to bead portions of the tire so as to bear expansive force from the foamed substance, so that the tire is replaceable relative to a separate metallic rim.

2 Claims, 4 Drawing Figures

FIG_1
PRIOR ART
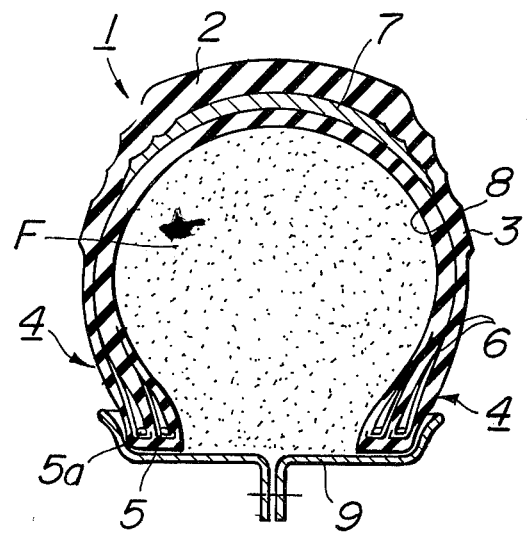
FIG_2
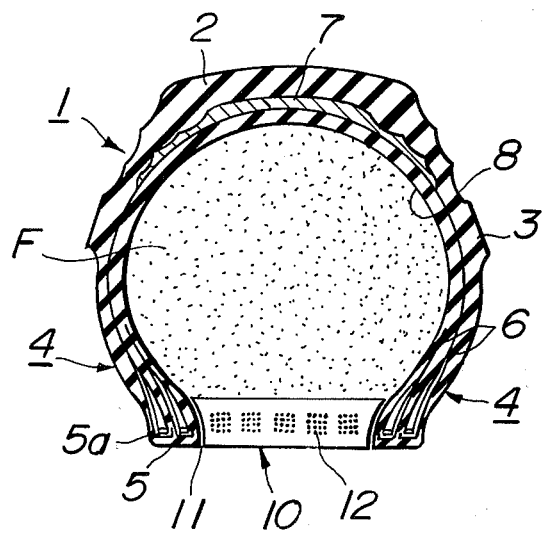

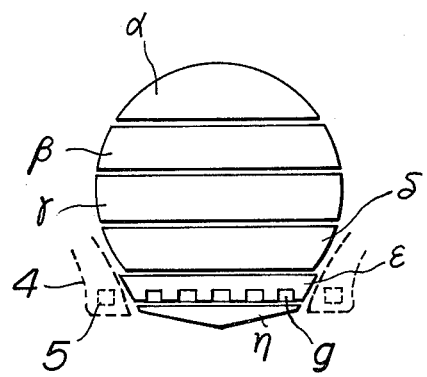
FIG_3
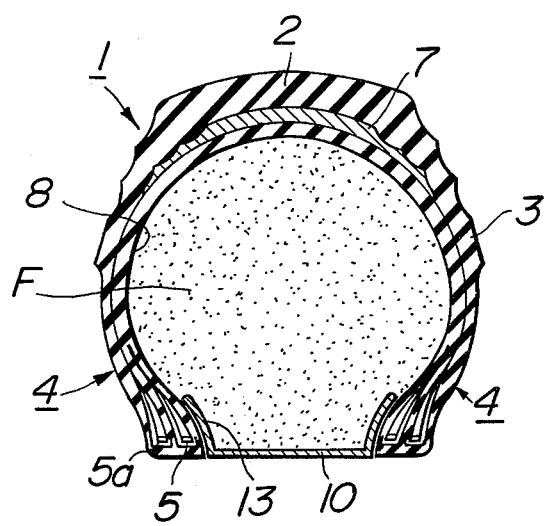
FIG_4

TIRE FILLED WITH FOAMED MATERIAL

BACKGROUND OF THE INVENTION

1. Field of the Invention

This invention relates to a tire filled with foamed material. More particularly, the present invention provides an improvement of a tire particularly suitable for heavy vehicle, e.g., fork-lift cars, which tire is filled not with air, but with elastic foamed material (to be referred to as "foam-filled tire," hereinafter), the improvement being directed to detachability of the tire relative to a metallic rim.

2. Description of the Prior Art

Conventionally, a foam-filled tire is made by filling the tire chamber of a tire case with a predetermined amount of starting rubber material mixed with a foaming agent, mounting the tire case on a metallic rim, and vulcanizing the tire as mounted on the rim, while simultaneously foaming the starting rubber material. The conventional foam-filled tire thus produced has the following shortcomings.

1. The foam-filled tire itself cannot be separated from or remounted to the metallic rim after the vulcanization, because the foamed material in the tire chamber is in direct contact with the metallic rim and expansive pressure of the foamed rubber is partly borne by the metallic rim.
2. Generally speaking, a tire of certain size is mountable to metallic rims of different dimensions, so as to facilitate the application of the tire to different kinds of vehicles having different tire-mounting disks. Accordingly, with the conventional foam-filled tire of the aforesaid construction, it becomes necessary to manufacture different foam-filled tires as mounted to metallic rims for different applications, even if the tire dimension itself is the same. As a result, the overall process of manufacturing the foam-filled tire becomes complicated and costly. Furthermore, the increased number of different types for a given tire size may cause inadvertent errors in sales and delivery.
3. The foam-filled tire which is inseparable from the metallic rim is not convenient for maintenance and inspection by users off work. If either the foam-filled tire or the metallic rim fails, both the tire and the rim must be discarded, despite the fact that the remaining tire on rim is still usable. Accordingly, the conventional foam-filled tire is uneconomical.

Therefore, an object of the present invention is to mitigate the aforesaid difficulties of the conventional foam-filled tire by providing an improved foam-filled tire.

SUMMARY OF THE INVENTION

According to the present invention, there is provided a tire comprising a pair of annular beads, a carcass extending across the two beads so as to define a tire chamber therein, a tread secured to the carcass at the crown portion thereof, a pair of sidewalls extending from edges of the tread to corresponding one of the two beads, respectively, elastic foamed material filling the tire chamber, a substantially cylindrical blocking ring having opposing edges secured to said two beads, respectively, so as to bear expansive pressure of the foamed material at the outer peripheral surface of the blocking ring.

BRIEF DESCRIPTION OF THE DRAWING

For a better understanding of the invention, reference is made to the accompanying drawing, in which:

FIG. 1 is a sectional view of a conventional tire which is filled with foamed material;

FIG. 2 is a sectional view of a foam-filled tire according to the present invention;

FIG. 3 is a schematic diagram, illustrating the manner in which material to be foamed is filled in tire chamber in a process of making the tire of FIG. 2; and FIG. 4 is a sectional view of another embodiment of the present invention.

Like parts are designated by like numerals and symbols throughout the different figures of the drawing.

DESCRIPTION OF THE PREFERRED EMBODIMENTS

A conventional foam-filled tire 1, as illustrated in FIG. 1, comprises a tread 2 disposed at the crown portion of the tire, a pair of sidewalls 3 each of which extends from one of the two side edges of the tread 2 to the corresponding one of the two bead portions 4, and a carcass 6 extending across the two bead portions 4 so as to define a tire chamber 8 therein. The sidewalls 3 and the tread 2 are secured to the outer peripheral surface of the carcass 6. In the illustrated tire, each bead portion 4 includes a pair of bead wires 5 and 5$a$, and two carcass plies are used inclusive of a carcass ply extending across the two bead wires 5 and another carcass ply extending across the other two bead wires 5$a$. Each carcass ply has opposing edges turned around so as to enclose the bead wire 5 or 5$a$. A breaker 7 is disposed between the carcass 6 and the tread 2. The tire chamber 8 is filled with elastic foamed material F, and a metallic rim 9 sealingly closes the thus filled tire chamber 8. Accordingly, the foam-filled tire 1 and the metallic rim 9 are integrally joined together.

With the conventional foam-filled tire 1 of the aforesaid construction, it is impossible to separate the metallic rim 9 from the tire while keeping the tire intact. More particularly, the foamed material F in the tire chamber 8 exerts expansive force to the rim 9, and if the rim 9 is removed, a part of the foamed material will protrude to the outside of the tire chamber 8 through the spacing between the two bead portions 4. Once the foamed material is protruded, it is impossible to remount the rim 9 onto the foam-filled tire 1.

To obviate such difficulty of the conventional foam-filled tire, the present invention provides an improved foam-filled tire, of which an embodiment is shown in FIG. 2. With the present invention, a substantially cylindrical blocking ring 10 is disposed in a space between two bead portions 4 of a tire 1, and the opposing edges of the cylindrical blocking ring 10 are sealingly secured to the bead portions 4 by means of adhesive layers 11, respectively. Thus, the foam-filled tire 1 according to the invention has a tire chamber 8 which is sealingly closed by the blocking ring 10. Preferably, the blocking ring 10 is formed of a suitable hard rubber, and the ring 10 may include one or more reinforcing ribs or annular members 12 disposed in the hard rubber wall thereof. The material and structure of the reinforcing members 12 may be similar to those of the bead cores 5 and 5$a$. If the hard rubber wall of the blocking ring 10 is very strong, the reinforcing members 12 can be dispensed with, so that the members 12 are not restrictive in the present invention. In the embodiment of the present invention, as illustrated in FIG. 2, two pairs of beads 5, 5a are used along with two carcass plies, but the present invention is not restricted to such structure of the carcass.

To ensure strong bondage of the foamed material F to other tire members surrounding the material F, a suitable cementing agent may be applied to the inner surfaces of the bead portions 4 and opposing end surfaces of the substantially cylindrical blocking ring 10. The cementing agent may produce strong bondage of the blocking ring 10 to the tire bead portions 4 during vulcanization of the tire 1. To further improve the bondage of the blocking ring 10 to the bead portions 4, the cross sectional shape of the hard rubber layer of the blocking ring 10 may be so chosen as to maximize surface area of the hard rubber layer facing the bead portions.

Referring to FIG. 3, in order to properly locate the foamed material F into the tire chamber 8, starting rubber for the foamed material F containing a suitable foaming agent is shaped into a plurality of endless annular segments $\alpha$, $\beta$, $\gamma$, and $\delta$. Such segments may be produced by extruding a strap of the starting rubber with a suitable cross sectional shape, and cutting and bonding the cut edges of the strap so as to produce the endless segments $\alpha$, $\beta$, $\gamma$, and $\delta$. When all the segments of the starting rubber for the foamed material F are placed in the tire chamber 8, such starting rubber occupies about 70 percent of the inside volume of the tire 1.

Separately, a hard rubber segment $\epsilon$ for the blocking ring 10 is prepared by using a suitable hard rubber through similar process to the segments of the foamed material F. This hard rubber segment $\epsilon$ is disposed between the two bead portions 4. In the embodiment of FIG. 3, five grooves $g$ are provided on the peripheral surface hard rubber segment $\epsilon$ facing the axis of rotation of the tire, so that five reinforcing members 12 can be disposed in the grooves. Each of the reinforcing members 12 is formed of a plurality of parallel steel wires which are suitably bundled together. The steel wires may be rubberized if so desired. Another cylindrical ring $\eta$, which is made of the same rubber as that of the segment $\epsilon$, is applied to the inner peripheral surface of the segment $\epsilon$, relative to the axis of rotation of the tire, so as to cover the grooves $g$ having the reinforcing members 12 disposed therein. The inner surfaces of the bead portions 4 of the tire 1 may be buffed prior to the insertion of the hard rubber segment $\epsilon$ therein, the opposing end portions of which segment $\epsilon$ may also be buffed, for improving the sealing connection of the blocking ring 10 to the tire 1. A suitable adhesive or cementing agent may be applied to the thus buffed surfaces of bead portions 4 and the edge portions of the annular blocking ring 10, so as to produce the adhesive layers 11. A jig of suitable shape, such as a rim similar to the metallic rim 9 of FIG. 1, may be used during the vulcanization, in order to bear the expansive force from the segments $\alpha$, $\beta$, $\gamma$, and $\delta$ of the material for the foamed member F. During the vulcanization, the rubber material of the member $\epsilon$ flows toward the inside surface of the sidewalls 3 of the tire, so that a very firm and stable bondage is formed between the blocking ring 10 and the foamed member F, as well as between the blocking ring 10 and the bead portions 4 of the tire. With such bondage of the blocking ring 10 to the bead portions 4, the tire 1 can easily be removed from and remounted to a separate metallic rim, without causing any deformation of the foamed member F.

The inventors have made a test tire of size 600–9 10PR with a blocking ring 10 made of an about 25 mm thick hard rubber layer with a Shore A hardness of 60°, the thickness of the rubber layer being measured in radial direction emanating from the axis of rotation of the tire. This blocking ring 10 was strengthened with five annular reinforcing members 12, each of which reinforcing members consisted of six rows of six 0.94 mm dia. steel wires. This test proved to provide satisfactory performance.

The reinforcing members 12 are, however, not essential in the tire of the present invention. More particularly, if the blocking ring 10 is made of a hard rubber with a sufficiently high hardness and a sufficiently large thickness, the reinforcing members 12 may be dispensed with. Alternately, the reinforcing members 12 may be formed of wires which are evenly disposed along the cylindrical wall of the blocking ring 10.

FIG. 4 illustrates another embodiment of the invention, in which a blocking ring 10 made of iron sheet is used. This blocking ring 10 comprises a drum portion, which extends substantially across the two bead portions 4, and a pair of flanges 13 extending radially outwardly from opposing edges of the drum portions. The flanges 13 of the blocking ring 10 may be bonded to the bead portions 4 of the tire. If, however, the flanges 13 extend sufficiently deeply into the tire chamber 8 defined within a toroidal carcass, such iron blocking ring 10 may be able to bear the expansive force of the foamed member F without being bonded to the bead portions 4 of a tire 1, according to the present invention.

As described in the foregoing disclosure, according to the present invention, expansive pressure from a foamed member disposed within a tire is borne by a substantially cylindrical blocking ring which is integrally bonded to bead portions of the tire so as to block the space therebetween. Accordingly, the tire filled with foamed material can easily be separated at will from a metallic rim, so that the tire inspection can be carried out more easily than conventional tires having foamed substance filled therein. Furthermore, with the present invention, when the service life of the tire is over, the old tire can be easily replaced with a new tire while using an old metallic rim, so as to improve the economy of the tire filled with foamed substance.

We claim:

1. A process for making a removable, foam filled tire for heavy vehicles comprising the steps of:
   a. inserting a plurality of annular segments of foamable material containing a foaming agent into a tire chamber;
   b. placing a first hard rubber annular segment between the bead portions of the tire, said first hard rubber portion having at least one groove on its radially inner surface;
   c. inserting a reinforcing member in said groove;
   d. placing a second hard rubber annular segment on said radially inner surface, and
   e. vulcanizing the tire assembly so as to cause said foamable material to foam, and to cause said first and second hard rubber annular segments to bond to the tire bead portions to thereby prevent escape of the foamed material.

2. The process of claim 1 wherein said first hard rubber annular segment is adhesively bonded to said tire bead portions.

* * * * *